(12) United States Patent
Wu et al.

(10) Patent No.: US 11,920,473 B2
(45) Date of Patent: Mar. 5, 2024

(54) DEVICE AND METHOD FOR INTEGRATED CONTROL OF ACID WASTEWATER PLUGGING AND DISCHARGING OF ABANDONED MINE

(71) Applicant: Nanchang University, Nanchang (CN)

(72) Inventors: Daishe Wu, Nanchang (CN); Jianlong Li, Nanchang (CN); Yu Xu, Nanchang (CN); Zhifei Ma, Nanchang (CN)

(73) Assignee: Nanchang University, Nanchang (CN)

( * ) Notice: Subject to any disclaimer, the term of this patent is extended or adjusted under 35 U.S.C. 154(b) by 714 days.

(21) Appl. No.: 17/147,461

(22) Filed: Jan. 13, 2021

(65) Prior Publication Data

US 2022/0018254 A1    Jan. 20, 2022

(30) Foreign Application Priority Data

Jul. 16, 2020   (CN) .......................... 202010684700.2
Aug. 31, 2020   (CN) .......................... 202010894147.5

(51) Int. Cl.
*E21F 17/103*     (2006.01)
*C02F 1/66*       (2023.01)
*F04F 10/00*      (2006.01)

(52) U.S. Cl.
CPC .............. *E21F 17/103* (2013.01); *C02F 1/66* (2013.01); *F04F 10/00* (2013.01)

(58) Field of Classification Search
None
See application file for complete search history.

(56) References Cited

U.S. PATENT DOCUMENTS

| | | | |
|---|---|---|---|
| 2007/0084769 A1* | 4/2007 | Moulton | ................ C02F 3/082 |
| | | | 210/150 |
| 2013/0048572 A1* | 2/2013 | Hawks | ..................... C02F 9/00 |
| | | | 210/170.03 |
| 2020/0017388 A1* | 1/2020 | Reches | ..................... C02F 9/00 |

FOREIGN PATENT DOCUMENTS

| | | |
|---|---|---|
| CN | 107935301 A | 4/2018 |
| CN | 106565012 B | 4/2019 |
| CN | 111706392 A | 9/2020 |

* cited by examiner

*Primary Examiner* — Richard C Gurtowski
(74) *Attorney, Agent, or Firm* — Bayramoglu Law Offices LLC

(57) ABSTRACT

A device for integrated control of acid wastewater plugging and discharging of an abandoned mine includes an airtight wall, a central controller, a $CO_2$ gas source, an agent bucket, a siphon pipe I and a liquid storage bucket are arranged on the outer side of the airtight wall, and a plurality of monitoring sensors are arranged in the inner side of the airtight wall, and the monitoring sensors are electrically connected to the central controller; and a flood discharge valve is arranged at the bottom of the airtight wall. The device is miniaturized and operates for a long time with low power consumption, thereby achieving long-term unattended operation and maintenance.

11 Claims, 1 Drawing Sheet

DEVICE AND METHOD FOR INTEGRATED CONTROL OF ACID WASTEWATER PLUGGING AND DISCHARGING OF ABANDONED MINE

CROSS REFERENCE TO THE RELATED APPLICATIONS

This application is based upon and claims the priority of the Chinese patent application filed on Aug. 31, 2020, with the application number of CN202010894147.5 and the Chinese patent application filed on Jul. 16, 2020, with the application number of CN202010684700.2, the entire contents of which are incorporated herein by reference.

TECHNICAL FIELD

The disclosure relates to the technical field of pollution treatment of abandoned mines, and in particular relates to a device and a method for integrated control of acid wastewater plugging and discharging of an abandoned mine.

BACKGROUND

Mineral resources are an important material basis of social production and development. 70% of industrial product raw materials and 90% of energy sources in China are originated from development and utilization of mineral resources. Restricted by geological reasons, hydrological reasons and deposit occurrence condition reasons as well as the mining technical level, natural features and environments are damaged inevitably, and plenty of solid wastes and wastewater which are hardly recycled are generated.

For example, rock soil is peeled on a large scale in open-pit mining, such that water and soil erosion is caused manually; a goaf formed by underground mining leads to ground subsidence, such that self-flowing circulation of underground water is damaged; and waste ores are stacked, such that a large area of land is occupied. Waste ores are always multi-element associated ores in a same ore deposit, and the most is sulfur and iron associated ore species. As the plenty of waste ores and the mining surface are exposed in the environment for a long time, acid wastewater is generated due to actions of air, water and microorganisms. The acid wastewater not only is low in pH and large in acidity, but also contains a lot of toxic and harmful heavy ions, and flows into natural water systems directly along with surface water, thereby threatening healthy living of human beings and animals and plants directly. The acid wastewater in the mining area is complex in component, large in water yield, prone to cause secondary pollution and hard to process. External discharge prevention and control of acid mine wastewater of the waste mines is always a global problem.

As far as the inventors know, the acid wastewater in the mining area can be controlled by inside filling and outlet plugging, for example, the Chinese patent application with the application number of 202010425951.9 discloses a plugging and construction method suitable for the remaining mines and mine tunnels.

SUMMARY

The present disclosure provides an acid wastewater plugging and discharging integrated control device and method for an abandoned mine. In some embodiments, all holes of the abandoned mine containing acid wastewater are blocked and the hole with drainage is provided with the device provided in present disclosure, which can inhibit acidification of the wastewater from the source, dredge external discharge of the mine water timely and integrates multiple functions and automatic control, and the device is miniaturized and operates automatically for a long time with low power consumption.

The device for integrated control of acid wastewater plugging and discharging of the abandoned mine, in accordance with some embodiments, comprises an airtight wall, the airtight wall is arranged in a position capable of being partitioned in a mine waste water discharging channel and the whole cross-section of the discharging channel is filled with the airtight wall.

A central controller, a $CO_2$ gas source, an agent bucket, a siphon pipe I and a liquid storage bucket are arranged on the outer side of the airtight wall, the central controller is connected to a power supply and a remote alarm, the $CO_2$ gas source is connected to the inner side of the airtight wall through a gas conveying pipe, and the agent bucket is connected to the inner side of the airtight wall through an agent supply pipeline.

An upper inlet and a lower inlet located in the inner side of the airtight wall and an outlet of a siphon pipe I located in the outer side of the airtight wall are disposed in the siphon pipe, wherein a height of the outlet of the siphon pipe I is less than a height of the lower inlet, the upper inlet is a horn-shaped opening downwards, a floating ball is arranged in the horn-shaped opening and filter screens are arranged at the upper inlet and lower inlet.

An overflow pipe is arranged in the liquid storage bucket, the overflow pipe is connected to the upper part of the inner side of the airtight wall, and an overflow port of the overflow pipe is higher than the highest point position of the siphon pipe I.

A plurality of monitoring sensors are arranged in the inner side of the airtight wall, and the monitoring sensors are connected to the central controller.

In some embodiments, a flood discharge valve is arranged at the bottom of the airtight wall, a fixed pulley block is arranged above the flood discharge valve, and two ends of the fixed pulley block are separately connected to the liquid storage bucket and the flood discharge valve.

In some embodiments, a gas supply valve connected to the central controller is arranged on the gas conveying pipe, and the middle section of the gas conveying pipe is divided into two parallel branches, the two parallel branches converged again are connected to a plurality of aeration discs arranged in the inner side of the airtight wall, and the uppermost aeration disc is higher than the siphon pipe I.

In some embodiments, an electromagnetic valve connected to the central controller is arranged on one parallel branch of the gas conveying pipe, a mechanical valve and a linking rod connected to the mechanical valve by a spring are arranged on the other parallel branch, and the linking rod is located right below the outlet of the siphon pipe I.

In at least one embodiment, the outlet of the siphon pipe I is arranged as a reverse U-shaped water sealing pipe, guaranteeing that a part of water column is retained in the siphon pipe I after drainage, thereby preventing air from entering a space in the inner side of the airtight wall through the siphon pipe I; and the height H2 from the upper inlet of the siphon pipe I to a bottom surface of the airtight wall is two times of the height H3 from the lower inlet to the bottom surface of the airtight wall, and the height H1 from the top end of the siphon pipe I to the bottom surface of the airtight wall is three times of the height H3 from the lower inlet to the bottom surface of the airtight wall.

In at least one embodiment, the airtight wall is provided with a safe outlet, an outside of the safe outlet is slant and is sealed by a seal cover, an upper end of the seal cover is hinged with the safe outlet; the safe outlet is provided with a lever group and an end of the lever group is configured with a ball float, the ball float subjected to buoyancy of mine water drives the lever group to rotate to push the seal cover.

In at least one embodiment, a pressure relief pipe is arranged above the airtight wall, the pressure relief pipe is higher than the safe outlet, a one-way valve which allows gas in the inner side of the airtight wall to flow toward the outer side of the airtight wall is arranged on the pressure relief pipe located on the outer side of the airtight wall.

In at least one embodiment, a siphon pipe II is arranged in the liquid storage bucket, an inlet section of the siphon pipe II is located in the liquid storage bucket and is fixed by a porous floating body, and a groove matched with the siphon pipe II is disposed in an upper edge of the liquid storage bucket.

In at least one embodiment, a liquid storage pipe communicates to the lower end of the overflow pipe, the liquid storage pipe leads to the lower part of the inner side of the airtight wall and a liquid storage valve is arranged on the liquid storage pipe, the liquid storage valve is connected to the central controller.

In at least one embodiment, a water spray preventing board is arranged above the liquid storage bucket.

In at least one embodiment, the diameter of the floating ball is greater than the pipe diameter of the siphon pipe I but smaller than the maximum diameter of the horn-shaped opening.

In at least one embodiment, the monitoring sensors comprise a $CO_2$ concentration sensor, an $O_2$ concentration sensor, a pH sensor and a bottom mud height sensor mounted on a buoy, wherein the $CO_2$ concentration sensor and the $O_2$ concentration sensor are mounted at the upper end of the buoy, and the probe of the $CO_2$ concentration sensor is 15-50 cm away from water surface; the pH sensor and the bottom mud height sensor are mounted at the lower end of the buoy, and the buoy floats on the surface of the mine water in the inner side of the airtight wall.

In at least one embodiment, a pressure sensor is arranged on the $CO_2$ gas source and is connected to the central controller.

In at least one embodiment, a carbon source and a sulfate reducing bacteria solution are arranged in the agent bucket.

In at least one embodiment, an agent supply pump is arranged on an agent supply pipeline connected to the agent bucket, and the agent supply pump is connected to the central controller.

The present disclosure also provides a method for integrated control of acid wastewater plugging and discharging of an abandoned mine, in accordance with some embodiments, the method comprises:

starting the agent supply pump by the central controller and adding an agent into the mine water by the agent bucket when the pH sensor detects that the pH value of the mine water is less than 6; and on the contrary, stopping the agent supply pump by the central controller;

opening the gas supply valve by the central controller when the $CO_2$ concentration sensor detects that the concentration of $CO_2$ in the inner side of the airtight wall is lower than 90% or the $O_2$ concentration sensor detects that the concentration of $O_2$ in the inner side of the airtight wall is higher than 5%, supplementing $CO_2$ gas to the inner side of the airtight wall by the $CO_2$ gas source, $CO_2$ gas arriving at the aeration discs by the gas conveying pipe, the $CO_2$ gas being dissolved in the mine water in an aeration form to displace dissolved oxygen in the mine water; and meanwhile, the $CO_2$ gas arrives a space above the mine water in the inner side of the airtight wall of the mine; and on the contrary, closing the gas supply valve by the central controller;

when the water level of the mine water is raised to the lower inlet of the siphon pipe I, the mine water starting to enter the inlet section of the siphon pipe I; when the water level of the mine water arrives to the highest position of the siphon pipe I, the mine water starting to enter an outlet section of the siphon pipe I and forming siphoning, the mine water being discharged continuously, and the water level of the mine water being declined from the highest position of the siphon pipe I to the upper inlet of the siphon pipe I due to the siphoning effect;

when the mine water is raised too fast and reaches a position of the overflow port of the overflow pipe, the overflown mine water entering the liquid storage bucket, the liquid storage bucket declining due to increase of weight and driving the flood discharge valve to rise, and the flood discharging valve being opened to discharge flood; as the siphon pipe II is arranged in the liquid storage bucket and is fixed to the porous floating body, the porous floating body absorbs water gradually and sinks, the siphon pipe II is immersed in water within a period of time and water in the liquid storage bucket enters the siphon pipe II to form an siphoning effect, and water in the liquid storage bucket is then discharged therewith, the liquid storage bucket rises due to decrease of weight and driving the flood discharge valve to decline, and the flood discharging valve being closed to plug the mine water in the airtight wall again;

if it is necessary to start the flood discharge valve in a forced manner, opening the liquid storage valve by the central controller, the mine water entering the liquid storage bucket through the liquid storage pipe, and weight of the liquid accumulated in the liquid storage bucket is increased, thereby the liquid storage bucket declines and drives the flood discharge valve to lift;

when the $CO_2$ concentration sensor detects that the concentration of $CO_2$ in the inner side of the airtight wall is lower than 85% for over 2 minutes or the $O_2$ concentration sensor detects that the concentration of $O_2$ in the inner side of the airtight wall is higher than 10% for over 2 minutes, starting a remote alarm by the central controller;

when the pressure sensor detects that the pressure value is lower than 0.3 MPa, starting the remote alarm by the central controller;

and when the pH sensor detects that the pH value of the mine water is smaller than 5.5 for over 10 minutes, starting the remote alarm by the central controller.

In some embodiments, the water level height of the mine water has three circumstances when the mine water starts to enter the outlet section of the siphon pipe I:

case I: when the water level of the mine water is raised to H3 position, the mine water starts to enter the siphon pipe I from the lower inlet, and the liquid level height in the siphon pipe I is equal to the water level height of the mine water, and at such time, the siphoning effect is not formed;

case II: when the water level of the mine water is raised to H2 position, the floating ball subjected to buoyancy of the mine water floats upward to plug the upper inlet, the mine water enters the siphon pipe I from the lower inlet, the liquid level height in the siphon pipe I is equal to the water level height of the mine water, and at such time, the siphoning effect is not formed; and case III: when the water level of the mine water is raised to H1 position, the mine water entering from the lower inlet in the siphon pipe I flows to the outlet of the siphon pipe I, the siphoning effect is formed, and the mine water starts to be discharged continuously by the siphon pipe I; when the water level of the mine water is declined gradually and is lower than the height H2 position of the upper inlet of the siphon pipe I, the floating ball is no longer subjected to buoyancy of the mine water and falls from the position of the upper inlet, and at such time, air starts to enter the siphon pipe I through the upper side, the mine water no longer enters the siphon pipe I through the lower inlet till the liquid from the upper inlet to the outlet section of the siphon pipe I is discharged to only a section of water column remaining in the U-shaped water sealing pipe at the outlet of the siphon pipe I, and therefore, the siphoning effect is finished and a drainage effect is finished;

when siphon drainage, under impact action of an outlet water flow of the siphon pipe I, the linking rod is bended rotatably downward to drive the mechanical valve to open by a spring, and a $CO_2$ gas source supplements $CO_2$ gas to the mine water through the mechanical valve by the gas conveying pipe; the higher the flow rate of siphon drainage is, the larger the impact action is, and by means of the linking rod, the larger deformation of the spring is and the larger aperture of the mechanical valve is, and the quicker the gas in the inner side of the airtight wall is supplemented.

The disclosure has the following beneficial effects:

integrated with a multifunctional automatic control system, the device supplies the agent automatically by monitoring the mine water pH feedback control system;

closed and isolated from oxygen to exhaust and relief pressure timely, the device supplements $CO_2$ gas automatically by monitoring concentrations of $CO_2$ and $O_2$ in the inner side of the airtight wall, and ores and water in the waste mine are separated from external air by the airtight wall, such that a condition that sulfides generated by contact of the mine water and continuous oxygen in the air are oxidized to produce acid is avoided; and by outward exhausting through the one-way valve, a bursting pressure to the airtight wall due to over pressure in the airtight wall is avoided;

reduce possible left sulfate radicals and sulfite radicals in the mine water by displacing dissolved oxygen by $CO_2$: $CO_2$ gas is introduced into the mine water in the aeration form to displace possible dissolved oxygen in water so as to prevent oxidization reaction of the sulfides and elemental sulfur in the mine water and the ores in the inner side and oxygen, and meanwhile, the introduced $CO_2$ gas fills the whole space of the closed inner side of the mine gradually to prevent the sulfides and elemental sulfur on the surface of the mine water and in the ores from being oxidized so as to avoid generation of acid substances from the source of the mine;

realize the storage of $CO_2$ in the abandoned mine, $CO_2$ storage is conducive to carbon storage and achieves carbon emission reduction. Abandoned mines use the technology provided by the present disclosure can significantly reduce the global greenhouse effect; a large amount of $CO_2$ can be injected into closed mines to form carbonate and bicarbonate with buffering capacity to increase the pH value of mine wastewater, reduce the load of mine water treatment, reduce the alkali consumption required for the neutralization of mine acid wastewater, avoid further acidification of mine wastewater, and thereby reduce the large amount of energy consumption caused by alkali production.

the device drains the liquid at a fixed depth by automatic siphoning: when water in the mine is raised to the height H1 position at the top end of the siphon pipe I, the siphoning effect is started automatically, and the mine water enters from the lower inlet of the siphon pipe I and is discharged outside the airtight wall; when the liquid level of the mine water is declined and is lower than the height H2 position of the upper inlet of the siphon pipe I, the floating ball is no longer subjected to buoyancy of the mine water and falls from the position where the upper inlet is plugged, and at such time, air enters the siphon pipe I to interrupt the siphoning effect, so that the mine water in a middle layer at a depth of H3 to H2 is discharged when the height of the waste liquor reaches H1; the mine water in a middle layer is discharged only, so that on the one hand, disturbance to bottom silt is avoided and on the other hand, discharge of the mine water at the upper part acidified as a result of contact with air (possibly oxidized water newly supplemented from cracks of rocks) is also avoided;

the device can drain and supplement gas and avoid negative pressure gas leakage: when the waste liquor is discharged by the siphon pipe I, the pressure of the inner side of the airtight wall will be decreased, so that on the one hand, draining difficulty is caused and on the other hand, the mine water in contact with oxygen in the air is acidified as the air outside the airtight wall may flow through a possible leakage channel; the mechanical valve is arranged at the outlet of the siphon pipe I to induce automatic siphon pipe drainage to start the $CO_2$ gas source to supplement $CO_2$ gas to the closed mine, so that the above two problems due to negative pressure are avoided;

and the device can discharge flood as a result of excessive water yield: the mine water is discharged by the overflow pipe and the flood discharge valve is ganged; and too much bottom mud in the inner side of the airtight wall can be removed by manually opening the flood discharge valve.

Meanwhile, the device is high in integration degree, is miniaturized and operates automatically for a long time with low power consumption, wherein the monitoring sensors, the central controller, the remote alarm, the valves and the like are weak current devices. The flood discharge valve is opened automatically based on gravity of the liquid storage bucket of the mine water, so that high and medium power consumption of the device is avoided. Long-time stable operation can be guaranteed only by a storage battery which supplies power, and therefore, long-term unattended operation and maintenance are achieved.

Figure 1:
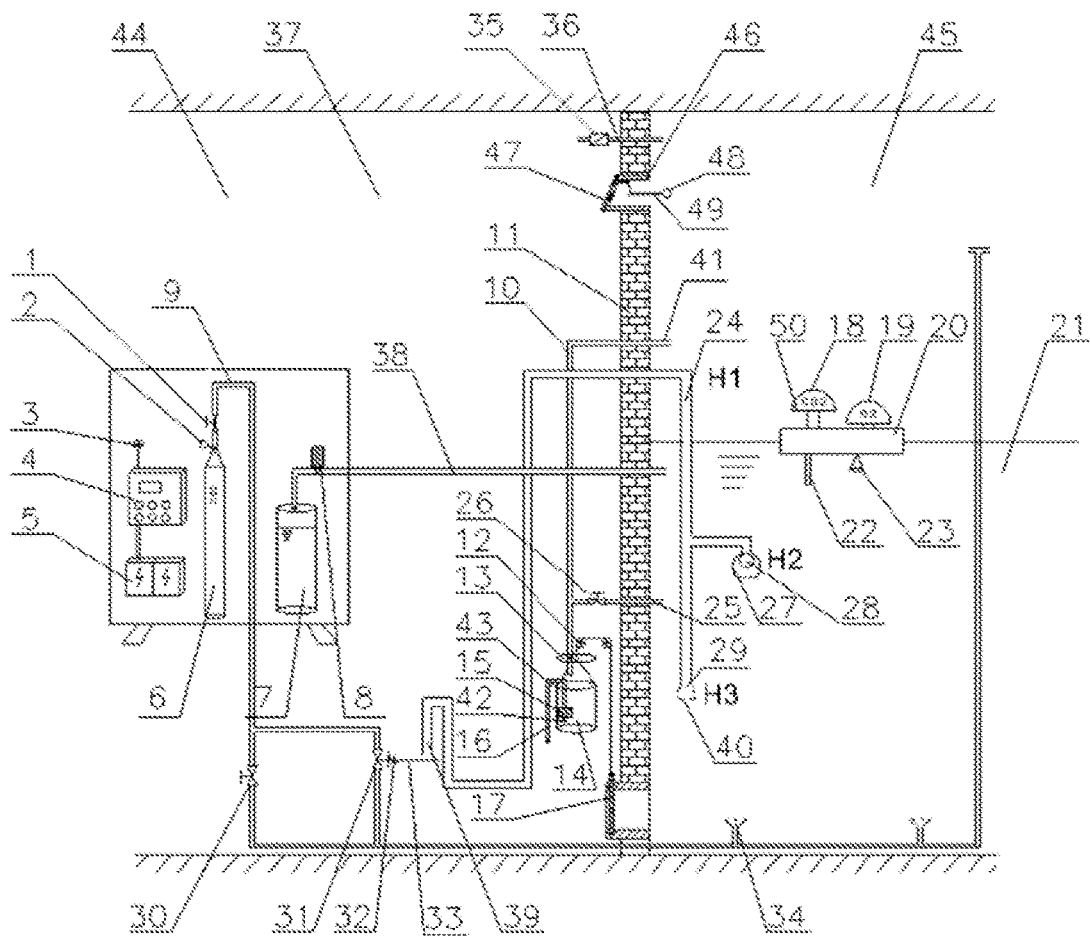
FIG. 1 shows a schematic diagram of a main body structure of the integrated control device.

in the figures, 1—gas supply valve, 2—pressure sensor, 3—remote alarm, 4—central controller, 5—power supply, 6—$CO_2$ gas source, 7—agent bucket, 8—agent supply pump, 9—gas conveying pipe, 10—overflow pipe, 11—airtight wall, 12—fixed pulley block, 13—water spray preventing board, 14—liquid storage bucket, 15—porous floating body, 16—siphon pipe II, 17—flood discharge valve, 18—$CO_2$ concentration sensor, 19—$O_2$ concentration sensor, 20—buoy, 21—mine water, 22—pH sensor, 23—bottom mud height sensor, 24—siphon pipe I, 25—liquid storage pipe, 26—liquid storage valve, 27—upper inlet, 28—floating ball, 29—lower inlet, 30—electromagnetic valve, 31—mechanical vale, 32—spring, 33—linking rod, 34—aeration disc, 35—one-way valve, 36—pressure relief pipe, 37—discharging channel, 38—agent supply pipeline, 39—outlet of the siphon pipe I, 40—filter screen, 41—overflow port, 42—inlet of the siphon pipe II, 43—groove, 44—outer side of the airtight wall, 45—inner side of the airtight wall, 46—safe outlet, 47—seal cover, 48—ball float, 49—lever group, 50—probe.

DETAILED DESCRIPTION

Clear and intact description of some embodiments of the disclosure is made in combination with drawings below. Obviously, the described embodiments are only a part of the embodiments of the disclosure, without covering all embodiments. Based on the embodiments of the disclosure, all the other embodiments obtained by those skilled in the art without inventive effort are within the scope of the disclosure.

In the description of the disclosure, it is understood that indicating orientation or position relationships such as "upper end", "lower end", "Inner side". "Outer side", "left", "right" and etc. are orientation or position relationships as shown in the drawings and it is intended to describe the disclosure and simplify the description rather than indicating or implying that the device or elements must be in specific orientations and must be constructed or operated in the specific orientations. Therefore, it should not be constructed as a limit to the disclosure.

In the disclosure, unless otherwise explicitly specified and stated herein, terms such as "arrange", "mount", "connect" and "fix" should be interpreted broadly, for example, fixed connection or detachable connection, mechanical connection and direct connection. The ordinary artisans concerned may understand the specific meaning of terms in this disclosure according to specific circumstance.

Example 1

Refer to FIG. 1, the device for integrated control of acid wastewater plugging and discharging of the abandoned mine comprises an airtight wall 11 and a central controller 4, a power supply 5, a $CO_2$ gas source 6, an agent bucket 7, a siphon pipe I 24, a pressure relief valve 17, a liquid storage bucket 14, a $CO_2$ concentration sensor 18, an $O_2$ concentration sensor 19, a pH sensor 22 and a bottom mud height sensor 23 arranged on two sides (as shown in the figure, the left side is the outer side of the airtight wall 44 and the right side is the inner side of the airtight wall 45) of the airtight wall 11;

the $CO_2$ gas source 6 leads to the inner side of the airtight wall 45 by the gas conveying pipe 9 and the gas supply valve 1 is arranged on the gas conveying pipe 9;

the agent bucket 7 is connected to the inner side of the airtight wall 45 through the agent supply pipeline 38, the agent supply pump 8 is arranged on the agent supply pipeline 38, and a carbon source and a sulfate reducing bacteria solution are mainly arranged in the agent bucket 7;

The inlets of the siphon pipe I 24 are configured in the inner side of the airtight wall 45 and the outlet of the siphon pipe I 39 is configured in the outer side of the airtight wall 44, and the inlet of the siphon pipe I 24 is higher than the outlet of the siphon pipe I 39;

the flood discharge valve 17 and the liquid storage bucket 14 are separately connected to two ends of a fixed pulley block 12 through ropes, the water spray preventing board 13 is arranged above the liquid storage bucket 14, the overflow pipe 10 penetrates the water spray preventing board 13 from the liquid storage bucket 14 to the upper part of the inner side of the airtight wall 45, and the overflow port 41 of the overflow pipe 10 is higher than the highest point position of the siphon pipe I 24; the liquid storage pipe 25 communicates next to the overflow pipe 10, the liquid storage pipe 25 is connected to the lower part of the inner side of the airtight wall 45, and the liquid storage valve 26 is arranged on the liquid storage pipe 25;

the liquid storage bucket 14 is provided with the siphon pipe II 16, the inlet section of the siphon pipe II 16 is located in the liquid storage bucket 14 and is fixed to the porous floating body 15, and a groove 43 matched with the siphon pipe II 16 is formed in the upper edge of the liquid storage bucket 14, so that the siphon pipe II 16 is embedded into the groove 43 when moving downward; the porous floating body 15 floats when being immersed into the liquid and the porous floating body 15 sinks into the liquid when the liquid is poured into the porous floating body 15 gradually through holes in the porous floating body 15;

the airtight wall 11 is provided with a safe outlet 46, an outside of the safe outlet 46 is slant, and a seal cover 47 is used to well seal the safe outlet 46 under gravity, an upper end of the seal cover 47 is hinged with the safe outlet 46; the safe outlet 46 is provided with a lever group 49 and an end of the lever group 49 is configured with a ball float 48, the ball float 48 subjected to buoyancy of mine water drives the lever group 49 to rotate to push the seal cover 47, thereby preventing the mine water from accumulating too fast and cause the airtight wall 11 to be broken down, which will cause a safety accident.

Figure 2:
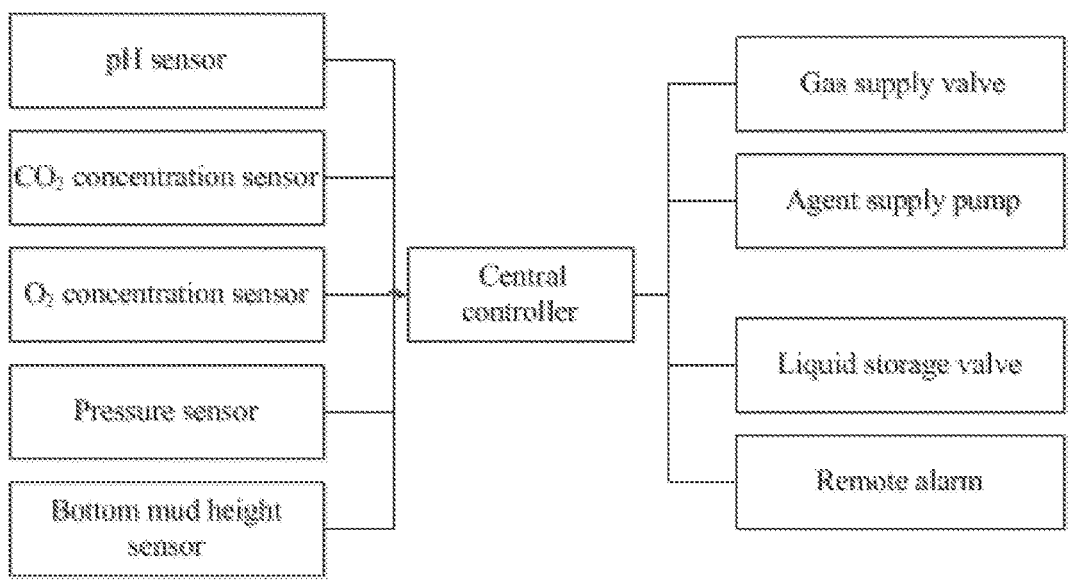
FIG. 2 shows a schematic diagram of a connecting structure of the central controller.

Refer to the FIG. 1 and FIG. 2, the $CO_2$ concentration sensor 18, the $O_2$ concentration sensor 19, the pH sensor 22 and the bottom mud height sensor 23 are electrically connected to the central controller 4; the pressure sensor 2 is arranged on the $CO_2$ gas source 6 and is connected to the central controller 4; the gas supply valve 1, the agent supply pump 8, the liquid storage valve 26 and the remote alarm 3 are connected to the central controller 4, and the central controller 4 is connected to the power supply 5.

The $CO_2$ concentration sensor 18 and the $O_2$ concentration sensor 19 are arranged at the upper end of the buoy 20 on the surface of the mine water 21, the pH sensor 22 and the bottom mud height sensor 23 are arranged at the lower end of the buoy 20, and the buoy 20 can drive the four sensors to rise or fall along with rise and fall of the water level of the mine water 21.

Example 2

Refer to the FIG. 1, the device for integrated control of acid wastewater plugging and discharging of the abandoned mine comprises an airtight wall 11 arranged in a position capable of being partitioned in a mine waste water discharging channel and the whole section of the discharging channel being filled with the airtight wall 11.

A central controller 4, a $CO_2$ gas source 6, an agent bucket 7, a siphon pipe I 24 and a liquid storage bucket 14 are arranged on the outer side of the airtight wall 44 (as shown in the figure, the left side is the outer side of the airtight wall 44 and the right side is the inner side of the airtight wall 45). The central controller 4 is connected to a power supply 5 and a remote alarm 3, the $CO_2$ gas source 6 leads to the inner side of the airtight wall 45 through the gas conveying pipe 9, the pressure sensor 2 is arranged on the $CO_2$ gas source 6 and is connected to the central controller 4, and the agent bucket 7 is connected to the inner side of the airtight wall 45 through the agent supply pipeline38;

an upper inlet 27 and a lower inlet 29 located in the inner side of the airtight wall 45 and an outlet of a siphon pipe I 39 located in the outer side of the airtight wall 44 are formed in the siphon pipe I 24, wherein the outlet of the siphon pipe I 39 is lower than the lower inlet 29, the upper inlet 27 is a horn-shaped opening downwards, a floating ball 28 is arranged in the horn-shaped opening, the diameter of the floating ball 28 is greater than the pipe diameter of the siphon pipe I 24 but smaller than the maximum diameter of the horn-shaped opening, and filter screens 40 are arranged at the upper inlet 29 and lower inlet 27;

a water spray preventing board 13 is arranged above the liquid storage bucket 14, the overflow pipe 10 is arranged in the liquid storage bucket 14 and leads to the upper part of the inner side of the airtight wall 45, and an overflow port 41 of the overflow pipe 10 is higher than the highest point position of the siphon pipe I 24;

a plurality of monitoring sensors are arranged in the inner side of the airtight wall 45, and the monitoring sensors are electrically connected to the central controller 4;

a flood discharge valve 17 is arranged at the bottom of the airtight wall 11, a fixed pulley block 12 is arranged above the flood discharge valve 17, and two ends of the fixed pulley block 12 are separately connected to the liquid storage bucket 14 and the flood discharge valve 17;

a gas supply valve 1 connected to the central controller 4 is arranged on the gas conveying pipe 9, and the middle section of the gas conveying pipe 9 is divided into two parallel branches, the two parallel branches converged again are connected to a plurality of aeration discs 34 arranged in the inner side of the airtight wall 45, and the uppermost aeration disc 34 is higher than the siphon pipe I 24;

an electromagnetic valve 30 connected to the central controller 4 is arranged on one of the parallel branches of the gas conveying pipe 9, a mechanical valve 31 and a linking rod 33 connected to the mechanical valve by a spring 32 are arranged on the other parallel branch, and the linking rod 33 is located right below the outlet of the siphon pipe I 39.

the outlet of the siphon pipe I 39 is arranged as a reverse U-shaped water sealing pipe, guaranteeing that a part of water column is retained in the siphon pipe I 24 after drainage, thereby preventing air from entering a space in the inner side of the airtight wall 45 through the siphon pipe I;

the height H2 from the upper inlet 27 of the siphon pipe I 24 to a bottom surface of the airtight wall 11 is two times of the height H3 from the lower inlet 29 to the bottom surface of the airtight wall 11, and the height H1 from the top end of the siphon pipe I 24 to the bottom surface of the airtight wall 11 is three times of the height H3 from the lower inlet 29 to the bottom surface of the airtight wall 11.

the upper part of the airtight wall 11 is provided with a pressure relief pipe 36, the pressure relief pipe 36 is higher than the safe outlet 46, a one-way valve 35 which allows gas in the inner side of the airtight wall 45 to flow toward the outer side of the airtight wall 44 is arranged on the pressure relief pipe 36 and is located in the outer side of the airtight wall 44.

A siphon pipe II 16 is arranged in the liquid storage bucket 14, an inlet of the siphon pipe II 42 is located in the liquid storage bucket 14 and is fixed by a porous floating body 15, and a groove 43 matched with the siphon pipe II 16 is formed in the upper edge of the liquid storage bucket 14.

A liquid storage pipe 25 communicates to the lower part of the overflow pipe 10, the liquid storage pipe 25 leads to the lower part of the inner side of the airtight wall 45 and a liquid storage valve 26 is arranged on the liquid storage pipe25; and the liquid storage valve 26 is connected to the central controller 4.

A carbon source and a sulfate reducing bacteria solution are arranged in the agent bucket 7.

An agent supply pump 8 is arranged on the agent supply pipeline 38 and is connected to the central controller 4.

The monitoring sensors comprise a $CO_2$ concentration sensor 18, an $O_2$ concentration sensor 19, a pH sensor 22 and a bottom mud height sensor 23 mounted on a buoy 20, wherein the $CO_2$ concentration sensor 18 and the $O_2$ concentration sensor 19 are mounted at the upper end of the buoy 20, and the probe 50 of the $CO_2$ concentration sensor 18 is 30 cm away from water surface, the pH sensor 22 and the bottom mud height sensor 23 are mounted at the lower end of the buoy 20, and the buoy 20 floats on the surface of the mine water 21 in the inner side of the airtight wall 45.

Example 3

A method for integrated control of acid wastewater plugging and discharging of the abandoned mine provided by the embodiment is applied to the device for integrated control of acid wastewater plugging and discharging of the abandoned mine in the example 1, the method comprises:

starting the agent supply pump 8 by the central controller 4 and adding an agent into the mine water 21 by the agent bucket 7 when the pH sensor 22 detects that the pH value of the mine water is less than 6; and on the contrary, stopping the agent supply pump 8 by the central controller 4;

opening the gas supply valve 1 by the central controller 4 when the $CO_2$ concentration sensor 18 detects that the concentration of $CO_2$ in the inner side of the airtight wall 45 is lower than 90% or the $O_2$ concentration sensor 19 detects that a concentration of $O_2$ in the inner side of the airtight wall 45 is higher than 5%, supplementing $CO_2$ gas to the inner side of the airtight wall 45 by the $CO_2$ gas source 6, $CO_2$ gas arriving at the aeration discs 34 by the gas conveying pipe 9, the $CO_2$ gas being dissolved in the mine water 21 in an aeration form to displace dissolved oxygen in the mine water 21; and meanwhile, the $CO_2$ gas arriving a space above the mine water 21 in the inner side of the airtight wall 45 of the mine; and on the contrary, closing the gas supply valve 1 by the central controller 4;

when the water level of the mine water 21 is raised to the lower inlet 29 of the siphon pipe I 24, the mine water 21 starting to enter an inlet section of the siphon pipe I 24; when the water level of the mine water 21 arrives to the highest position of the siphon pipe I 24, the mine water 21 starting to enter an outlet section of the siphon pipe I 24 and forming siphoning, the mine water 21 being discharged continuously, and the water level of the mine water 21 being declined from the highest position of the siphon pipe I 24 to the upper inlet 27 position of the siphon pipe I 24 due to the siphoning effect;

when the mine water 21 is raised too fast and reaches a position of the overflow port 41 of the overflow pipe 10, the overflown mine water 21 entering the liquid storage bucket 14, the liquid storage bucket 14 declining due to increase of weight and driving the flood discharge valve 17 to rise, and the flood discharging valve 17 being opened to discharge flood; as the siphon pipe II 16 is arranged in the liquid storage bucket 14 and is fixed to the porous floating body 15, the porous floating body 15 absorbs water gradually and sinks, the siphon pipe II 16 is immersed in water within a period of time and water in the liquid storage bucket 14 enters the siphon pipe II 16 to form the siphoning effect, and water in the liquid storage bucket 14 is then discharged therewith, the liquid storage bucket 14 rises due to decrease of weight and driving the flood discharge valve 17 to decline, and the flood discharging valve 17 being closed to plug the mine water 21 in the airtight wall 11 again;

if it is necessary to start the flood discharge valve 17 in a forced manner, opening the liquid storage valve 26 by the central controller 4, the mine water 21 entering the liquid storage bucket 14 through the liquid storage pipe 25, and weight of the liquid accumulated in the liquid storage bucket 14 is increased, thereby the liquid storage bucket 14 declines and drives the flood discharge valve 17 to lift;

when the $CO_2$ concentration sensor 18 detects that the concentration of $CO_2$ in the inner side of the airtight wall 45 is lower than 85% for over 2 minutes or the $O_2$ concentration sensor 19 detects that the concentration of $O_2$ in the inner side of the airtight wall 45 is higher than 10% for over 2 minutes, starting a remote alarm 3 by the central controller 4;

when the pressure sensor 2 detects that the pressure value is lower than 0.3 MPa, starting the remote alarm by the central controller 4;

and when the pH sensor 22 detects that the pH value of the mine water 21 is smaller than 5.5 for over 10 minutes, starting the remote alarm 3 by the central controller 4.

Example 4

After the integrated control device of the embodiment 2 is mounted in a proper position of the abandoned mine and pit, the central controller 4 is started to operate.

The mine water 21 in the inner side of the airtight wall 45 is accumulated, and the water level is raised gradually.

If the pH value of the mine water 21 detected by the pH sensor 22 is 5.8, the agent supply pump 8 is started by the central controller 4, and the agent bucket 7 adds an agent into the mine water 21; and when the pH detected again is 6.5, the agent supply pump 8 is stopped adding the agent.

If a $CO_2$ concentration detected by the $CO_2$ concentration sensor 18 is 85%, or a $O_2$ concentration detected by the $O_2$ concentration sensor 19 is higher than 5%, the gas supply valve 1 is started by the central controller 4, and the $CO_2$ gas source 6 supplements $CO_2$ gas to the inner side of the airtight wall 45; if a $CO_2$ concentration detected is 93% and a $O_2$ concentration detected is lower than 5%, the air supply valve 1 is closed.

As the air pressure of the inner side of the airtight wall 45 is increased gradually due to accumulation of the mine water 21, air pushes the one-way valve 35 to open and is exhausted by the pressure relief pipe 36, so that a condition that the airtight wall 11 subjected to a large stress is damaged as a result of over pressure of the inner side of the airtight wall 45 is avoided.

As needed, the electromagnetic valve 30 is opened by the central controller 4, $CO_2$ in the $CO_2$ gas source 6 arrives at the aeration discs 34 through the gas conveying pipe 9, $CO_2$ gas is dissolved in the mine water 21 in an aeration form to displace dissolved oxygen in the mine water 21, so as to prevent oxidization reaction of the sulfides and elemental sulfur in the mine water 21 and the ores in the inner side and oxygen. Meanwhile, the probe 50 of the $CO_2$ concentration sensor 18 is set 30 cm away from water surface, the $CO_2$ gas arrives a space above the mine water 21 in the inner side of the airtight wall 45 of the mine to form a 30 cm $CO_2$ protect layer to prevent the sulfides and elemental sulfur on the surface of the mine water 21 and in the ores from being oxidized.

When the water level of the mine water 21 is raised to H3 position, the mine water 21 starts to enter the siphon pipe I 24 from the lower inlet 29, and the liquid level height in the siphon pipe I 24 is equal to the water level height of the mine water 21, and at such time, the siphoning effect is not formed;

when the water level of the mine water 21 is raised to H2 position, the floating ball 28 subjected to buoyancy of the mine water 21 floats upward to plug the upper inlet 27, the mine water 21 enters the siphon pipe from the lower inlet 29, the liquid level height in the siphon pipe I 24 is equal to the water level height of the mine water 21, and at such time, the siphoning effect is not formed;

when the water level of the mine water 21 is raised to H1 position, the mine water 21 entering from the lower inlet 29 in the siphon pipe I 24 flows to the outlet of the siphon pipe I 39, the siphoning effect is formed, and the mine water 21 starts to be discharged continuously by the siphon pipe I 24; when the water level of the mine water 21 is declined gradually and is lower than the height H2 position of the upper inlet 27 of the siphon pipe I 24, the floating ball 28 is no longer subjected to buoyancy of the mine water 21 and falls from the position of the upper inlet 27, and at such time, air starts to enter the siphon pipe I 24 through the upper side, the mine water 21 no longer enters the siphon pipe I 24 through the lower inlet 29 till the liquid from the upper inlet 27 to the outlet section of the siphon pipe I 24 is discharged to only a section of water column remaining in the reverse U-shaped water sealing pipe at the outlet section, and therefore, the siphoning effect is finished and a drainage effect is finished;

when siphon pipe drainage, under impact action of an outlet water flow of the siphon pipe I 24, the linking rod 33 is bended rotatably downward to drive the mechanical valve 31 to open by the spring 32, and a $CO_2$ gas source 5 supplements $CO_2$ gas to the mine water 21 by the gas conveying pipe 9 after the mechanical valve 31 is opened. As gas is supplemented, a negative pressure in the inner side of the airtight wall 45 is avoided, so that air outside the airtight wall 11 is prevented from entering the inner side of the airtight wall 45 through a possible crack channel. Furthermore, the higher the flow rate of siphon pipe drainage is, the larger the impact action is, and by means of the linking rod 33, the larger deformation of the spring 32 is and the larger aperture of the mechanical valve 31 is, the quicker gas in the inner side of the airtight wall 45 being supplemented.

A reverse U-shaped water sealing pipe is arranged in front of the outlet of the siphon pipe I 24, guaranteeing that a part of water column is retained in the siphon pipe I 24 after drainage, thereby preventing air from entering a space in the inner side of the airtight wall 45 through the siphon pipe I 24.

When the mine water 21 is raised too fast and arrives in a position of the overflow port 41 of the overflow pipe 10, the overflown mine water 21 enters the liquid storage bucket 14, and the liquid storage bucket 14 starts to decline due to increase of gravity and drives the flood discharge valve 17 to rise which is connected together with the liquid storage bucket 14 and is located at the other end of the fixed pulley, so that the flood discharge valve 17 is opened to achieve flood discharge. As the siphon pipe II 16 is arranged in the liquid storage bucket 14 and is fixed to the porous floating body 15, the porous floating body 15 absorbs water gradually to sink, the siphon pipe II 16 is immersed in water within a period of time and water in the liquid storage bucket 14 enters the siphon pipe II 16 to form the siphoning effect, and water in the liquid storage bucket 14 is then discharged therewith, the liquid storage bucket 14 then rises due to decrease of weight and drives the flood discharge valve 17 to decline, and the flood discharging valve 17 being closed to plug the mine water 21 in the airtight wall 11 again;

if it is necessary to start the flood discharge valve 17 in a forced manner, the liquid storage valve 17 is opened by the central controller 4, the mine water 21 enters the liquid storage bucket 14 through the liquid storage pipe 25, and the weight of the liquid accumulated in the liquid storage bucket 14 is increased, thereby the liquid storage bucket 14 declines and drives the flood discharge valve 17 to lift;

When a concentration of $CO_2$ detected by the $CO_2$ concentration sensor 18 is lower than 85% for over 2 minutes or a concentration of $O_2$ detected by the $O_2$ concentration sensor 19 is higher than 10% for over 2 minutes, it is indicated that the airtight wall 11 may not be closed tightly, and the remote alarm 3 is started by the central controller 4;

When a pressure value detected by the pressure sensor 2 is lower than 0.3 MPa, it is indicated that the $CO_2$ gas source 6 is about to exhaust, and the remote alarm 3 is started by the central controller 4; and when the pH value detected by the pH sensor 22 is smaller than 5.5 for over 10 minutes, it is indicated that the agent is exhausted, and the remote alarm 3 is started by the central controller 4.

Finally, it should be noted that the above description is only some embodiments of the disclosure, and is not used to limit the disclosure. Although the disclosure is described in detail with reference to the foregoing embodiments, those skilled in the art can still modify the technical solutions described in the foregoing embodiments, or equivalently replace some of the technical features. Any modification, equivalent replacement, improvement, or the like made within the spirit and principle of the disclosure shall fall within the protection scope of the disclosure.

The invention claimed is:

1. A device for integrated control of acid wastewater plugging and discharging of an abandoned mine, comprising an airtight wall, the airtight wall is arranged in a position for partitioning a mine waste water discharging channel and a whole cross-section of the mine waste water discharging channel is filled with the airtight wall, wherein, a central controller, a $CO_2$ gas source, an agent bucket, a first siphon pipe and a liquid storage bucket are arranged on an outer side of the airtight wall, the central controller is connected to a power supply and a remote alarm, the $CO_2$ gas source leads to an inner side of the airtight wall through a gas conveying pipe, and the agent bucket is connected to the inner side of the airtight wall through an agent supply pipeline;

an upper inlet and a lower inlet of the first siphon pipe is configured in the inner side of the airtight wall and an outlet of the first siphon pipe is configured in the outer side of the airtight wall, a height of the outlet of the first siphon pipe is less than a height of the lower inlet, the upper inlet is a horn-shaped opening downwards and a floating ball is arranged in the horn-shaped opening, the upper inlet and lower inlet are both provided with a filter screen;

an overflow pipe is arranged in the liquid storage bucket, the overflow pipe leads to an upper part of the inner side of the airtight wall, and an overflow port of the overflow pipe is higher than a highest point position of the first siphon pipe;

a plurality of monitoring sensors are arranged in the inner side of the airtight wall, and the plurality of monitoring sensors are connected to the central controller; and a flood discharge valve is arranged at a bottom of the airtight wall, a fixed pulley block is arranged above the flood discharge valve, and two ends of the fixed pulley block are separately connected to the liquid storage bucket and the flood discharge valve.

2. The device according to claim 1, wherein, a gas supply valve connected to the central controller is arranged on the gas conveying pipe, and a middle section of the gas conveying pipe is divided into two parallel branches, the two parallel branches converged again are connected to a plurality of aeration discs arranged in the inner side of the airtight wall, and an uppermost aeration disc of the plurality of aeration discs is higher than the first siphon pipe; and an electromagnetic valve connected to the central controller is arranged on a first branch of the two parallel branches of the gas conveying pipe, a mechanical valve and a linking rod connected to the mechanical valve by a spring are arranged on a second branch of the two parallel branches, and the linking rod is located right below the outlet of the first siphon pipe.

3. The device according to claim 1, wherein, the outlet of the first siphon pipe is arranged as a reverse U-shaped water sealing pipe; and a second height from the upper inlet of the first siphon pipe to a bottom surface of the airtight wall is two times of a third height from the lower inlet to the bottom surface of the airtight wall, and a first height from a top end of the first siphon pipe to the bottom surface of the airtight wall is three times of the third height from the lower inlet to the bottom surface of the airtight wall.

4. The device according to claim 1, wherein, the airtight wall is provided with a safe outlet, an outside of the safe outlet is slant and is sealed by a seal cover, an upper end of the seal cover is hinged with the safe outlet; the safe outlet is provided with a lever group and an end of the lever group is configured with a ball float, the ball float subjected to buoyancy of mine water drives the lever group to rotate to push the seal cover.

5. The device according to claim 4, wherein, the upper part of the airtight wall is further provided with a pressure relief pipe, the pressure relief pipe is higher than the safe outlet, a one-way valve is configured to allow gas in the inner side of the airtight wall to flow toward the outer side of the airtight wall, and the one-way valve is arranged on the pressure relief pipe and is located in the outer side of the airtight wall.

6. The device according to claim 1, wherein, a second siphon pipe is arranged in the liquid storage bucket, an inlet of the second siphon pipe is located in the liquid storage bucket and is fixed by a porous floating body, and a groove matched with the second siphon pipe is disposed in an upper edge of the liquid storage bucket.

7. The device according to claim 1, wherein,
a liquid storage pipe communicates to a lower part of the overflow pipe, the liquid storage pipe leads to a lower part of the inner side of the airtight wall and a liquid storage valve is arranged on the liquid storage pipe, the liquid storage valve is connected to the central controller.

8. The device according to claim 1, wherein,
a carbon source and a sulfate reducing bacteria solution are arranged in the agent bucket; an agent supply pump is arranged on the agent supply pipeline connected to the agent bucket, and the agent supply pump is connected to the central controller.

9. The device according to claim 1, wherein,
the plurality of monitoring sensors include a $CO_2$ concentration sensor, an $O_2$ concentration sensor, a pH sensor and a bottom mud height sensor, wherein the $CO_2$ concentration sensor, the $O_2$ concentration sensor, the pH sensor and the bottom mud height sensor are mounted on a buoy, the $CO_2$ concentration sensor and the $O_2$ concentration sensor are mounted at an upper end of the buoy, and a probe of the $CO_2$ concentration sensor is 15-50 cm away from a surface of mine water; the pH sensor and the bottom mud height sensor are mounted at a lower end of the buoy, and the buoy floats on the surface of the mine water in the inner side of the airtight wall.

10. A method for integrated control of acid wastewater plugging and discharging of an abandoned mine, wherein, the method is applied to the device of claim 1, the method comprising:
starting an agent supply pump by the central controller and adding an agent into the mine water by the agent bucket when a pH sensor detects that a pH value of mine water is smaller than 6; and stopping the agent supply pump by the central controller when the pH sensor detects that the pH value of the mine water is larger than or equal to 6;
opening a gas supply valve by the central controller when a $CO_2$ concentration sensor detects that a concentration of $CO_2$ in the inner side of the airtight wall is lower than 90% or a $O_2$ concentration sensor detects that a concentration of $O_2$ in the inner side of the airtight wall is higher than 5%, supplementing $CO_2$ gas to the inner side of the airtight wall by the $CO_2$ gas source, $CO_2$ gas arriving at a plurality of aeration discs by the gas conveying pipe, the $CO_2$ gas being dissolved in the mine water in an aeration form to displace dissolved oxygen in the mine water, and meanwhile, the $CO_2$ gas arriving a space above the mine water in the inner side of the airtight wall of the abandoned mine; and closing the gas supply valve by the central controller when the $CO_2$ concentration sensor detects that the concentration of $CO_2$ in the inner side of the airtight wall is higher than or equal to 90% or the $O_2$ concentration sensor detects that the concentration of $O_2$ in the inner side of the airtight wall is lower than or equal to 5%;
when a water level of the mine water is raised to the lower inlet of the first siphon pipe, the mine water starting to enter an inlet section of the first siphon pipe; when the water level of the mine water arrives to a highest position of the first siphon pipe, the mine water starting to enter an outlet section of the first siphon pipe to form a siphoning effect, the mine water being discharged continuously, and the water level of the mine water being declined from the highest position of the first siphon pipe to the upper inlet of the first siphon pipe due to the siphoning effect;
when the mine water is raised too fast and reaches an overflow port position of the overflow pipe, overflown mine water entering the liquid storage bucket, the liquid storage bucket declining due to increase of weight and driving the flood discharge valve to rise, and the flood discharging valve being opened to discharge flood; a second siphon pipe is arranged in the liquid storage bucket and is fixed to a porous floating body, the porous floating body absorbing water gradually and sinking, the second siphon pipe immersing in water within a period of time and water in the liquid storage bucket entering the second siphon pipe to form the siphoning effect, and the overflown mine water in the liquid storage bucket then being discharged, the liquid storage bucket rising due to decrease of weight and driving the flood discharge valve to decline, and the flood discharging valve being closed to plug the mine water in the airtight wall again;
when the flood discharge valve is required to be started in a forced manner, opening a liquid storage valve by the central controller, the mine water entering the liquid storage bucket through a liquid storage pipe, and the liquid storage bucket accumulating liquid internally to increase weight, the liquid storage bucket declining and driving the flood discharge valve to lift and start;
when the $CO_2$ concentration sensor detects that the concentration of $CO_2$ in the inner side of the airtight wall is lower than 85% for over 2 minutes or the $O_2$ concentration sensor detects that the concentration of $O_2$ in the inner side of the airtight wall is higher than 10% for over 2 minutes, starting the remote alarm by the central controller;
when a pressure sensor detects that a pressure value is lower than 0.3 MPa, starting the remote alarm by the central controller; and
when the pH sensor detects that the pH value of the mine water is smaller than 5.5 for over 10 minutes, starting the remote alarm by the central controller.

11. The method according to claim 10, wherein,
a second height from the upper inlet of the first siphon pipe to a bottom surface of the airtight wall is two times of a third height from the lower inlet to the bottom surface of the airtight wall, and a first height from a top end of the first siphon pipe to the bottom surface of the airtight wall is three times of the third height from the lower inlet to the bottom surface of the airtight wall;
a height of the water level of the mine water has three cases when the mine water starts to enter the outlet section of the first siphon pipe:
a first case comprises: when the water level of the mine water is raised to the third height, the mine water starting to enter the first siphon pipe from the lower inlet, and a liquid level height in the first siphon pipe is equal to the height of the water level of the mine water, and at such time, the siphoning effect is not formed;
a second case comprises: when the water level of the mine water is raised to the second height, the floating ball subjected to a buoyancy of the mine water floating upward to plug the upper inlet, the mine water entering the first siphon pipe from the lower inlet, the liquid level height in the first siphon pipe is equal to the height of the water level of the mine water, and at such time, the siphoning effect is not formed; and a third case comprises: when the water level of the mine water is raised to the first height, the mine water entering from the lower inlet in the first siphon pipe and flowing to the outlet of the first siphon pipe, the siphoning effect being formed, and the mine water starting to be discharged continuously by the first siphon pipe; when the water level of the mine water is declined gradually and is lower than the second height of the upper inlet of the first siphon pipe, the floating ball is no longer subjected to the buoyancy of the mine water and falling from the second height of the upper inlet, and at such time, air starting to enter the first siphon pipe through the upper inlet, the mine water no longer entering the first siphon pipe through the lower inlet till the liquid from the upper inlet to an outlet section of the first siphon pipe is discharged to only a section of water column remaining in a reverse U-shaped water sealing pipe at the outlet of the first siphon pipe, and therefore, the siphoning effect is finished and a drainage effect is finished;

during drainage of the first siphon pipe, under impact action of an outlet water flow of the first siphon pipe, a linking rod being bended rotatably downward to drive a mechanical valve to open by a spring, and a $CO_2$ gas source supplements $CO_2$ gas to the mine water through the mechanical valve by the gas conveying pipe.

\* \* \* \* \*